(12) United States Patent
Heo et al.

(10) Patent No.: US 11,773,568 B2
(45) Date of Patent: Oct. 3, 2023

(54) BRAKING CONTROL DEVICE AND BRAKING CONTROL METHOD OF CONSTRUCTION MACHINE

(71) Applicant: Doosan Infracore Co., Ltd., Incheon (KR)

(72) Inventors: Yeonhaeng Heo, Incheon (KR); Kwangseok Park, Incheon (KR); Gyuhong Park, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 650 days.

(21) Appl. No.: 16/963,698

(22) PCT Filed: Jan. 28, 2019

(86) PCT No.: PCT/KR2019/001154
§ 371 (c)(1),
(2) Date: Jul. 21, 2020

(87) PCT Pub. No.: WO2019/151731
PCT Pub. Date: Aug. 8, 2019

(65) Prior Publication Data
US 2021/0079623 A1    Mar. 18, 2021

(30) Foreign Application Priority Data
Jan. 31, 2018    (KR) .................. 10-2018-0012106

(51) Int. Cl.
*B60T 13/18*    (2006.01)
*E02F 9/20*    (2006.01)
(Continued)

(52) U.S. Cl.
CPC ............ *E02F 9/2083* (2013.01); *B60T 7/042* (2013.01); *B60T 8/17* (2013.01); *B60T 8/171* (2013.01);
(Continued)

(58) Field of Classification Search
CPC ...... E02F 3/283; E02F 9/2083; B60T 13/686; B60T 13/16; B60T 13/18; B60T 8/306;
(Continued)

(56) References Cited

U.S. PATENT DOCUMENTS 5,752,747 A * 5/1998 Decker ................. B60T 13/683
303/9.62
5,865,512 A * 2/1999 Meiser .................. E02F 9/2025
180/197
(Continued)

FOREIGN PATENT DOCUMENTS

CN    103189247 A    7/2013
CN    103648865 A    3/2014
(Continued)

OTHER PUBLICATIONS

International Search Report for related International Application No. PCT/KR2019/001154; report dated Aug. 8, 2019; (5 pages).
(Continued)

*Primary Examiner* — Bradley T King
(74) *Attorney, Agent, or Firm* — K&L Gates LLP

(57) ABSTRACT

A brake control apparatus for construction machinery, includes first and second brake lines through which a brake oil is supplied to a front brake device and a rear brake device of the construction machinery, first and second proportional flow control valves installed respectively in the first and second brake lines to control a flow rate of the brake oil in proportion to inputted first and second brake control signals, a sensing portion configured to detect work and travel information of the construction machinery, and a controller configured to output the first and second brake control signals in response to a brake manipulation signal of a driver, and configured to control independently the first and second proportional flow control valves based on the work
(Continued)

and travel information of the construction machinery detected by the sensing portion.

16 Claims, 7 Drawing Sheets

(51) Int. Cl.
*B60T 7/04* (2006.01)
*B60T 8/17* (2006.01)
*B60T 8/171* (2006.01)
*B60T 8/172* (2006.01)
*B60T 8/176* (2006.01)
*B60T 8/18* (2006.01)
*B60T 8/24* (2006.01)
*B60T 8/32* (2006.01)
*B60T 8/92* (2006.01)

(52) U.S. Cl.
CPC .............. *B60T 8/172* (2013.01); *B60T 8/176* (2013.01); *B60T 8/18* (2013.01); *B60T 8/245* (2013.01); *B60T 8/321* (2013.01); *B60T 8/326* (2013.01); *B60T 8/92* (2013.01); *B60T 13/18* (2013.01); *B60T 2210/20* (2013.01); *B60T 2220/04* (2013.01); *B60T 2250/00* (2013.01); *B60T 2250/04* (2013.01); *B60T 2270/10* (2013.01); *B60T 2270/402* (2013.01); *B60T 2270/404* (2013.01); *B60T 2270/82* (2013.01)

(58) Field of Classification Search
CPC .......... B60T 8/346; B60T 8/349; B60T 7/042; B60T 8/17; B60T 8/171; B60T 8/172; B60T 8/18; B60T 8/245; B60T 8/321; B60T 8/92; B60T 2210/20; B60T 2220/04; B60T 2250/00; B60T 2250/04; B60T 2270/10; B60T 2270/402; B60T 2270/404; B60T 2270/82
See application file for complete search history.

(56) References Cited

U.S. PATENT DOCUMENTS

| | | | | |
|---|---|---|---|---|
| 6,019,442 | A * | 2/2000 | Zechmann | B60T 8/1766 303/155 |
| 6,533,366 | B1 * | 3/2003 | Barron | B60T 8/4275 310/307 |
| 2006/0230751 | A1 | 10/2006 | Huang et al. | |
| 2008/0262682 | A1 * | 10/2008 | Bergsten | B60T 8/1766 701/50 |
| 2009/0111655 | A1 * | 4/2009 | Hatanaka | E02F 9/2246 477/218 |
| 2013/0190992 | A1 * | 7/2013 | Uematsu | B60T 8/175 701/50 |
| 2014/0039767 | A1 * | 2/2014 | Jensen | E02F 9/2079 701/50 |
| 2016/0090715 | A1 | 3/2016 | Wen et al. | |
| 2016/0304071 | A1 | 10/2016 | Fukuda et al. | |
| 2018/0029577 | A1 * | 2/2018 | Beauvais | B60T 8/176 |
| 2019/0211529 | A1 * | 7/2019 | Vigholm | E02F 9/2253 |
| 2020/0047738 | A1 * | 2/2020 | Zimmerman | B60W 10/188 |
| 2020/0122703 | A1 * | 4/2020 | Suomi | E21F 13/025 |
| 2020/0216045 | A1 * | 7/2020 | Rothhämel | B62D 9/005 |
| 2021/0163064 | A1 * | 6/2021 | Brenninger | B62D 11/08 |
| 2022/0178112 | A1 * | 6/2022 | Brattberg | B60W 30/09 |
| 2022/0389684 | A1 * | 12/2022 | Okabe | E02F 9/24 |

FOREIGN PATENT DOCUMENTS

| | | |
|---|---|---|
| CN | 104822571 A | 8/2015 |
| EP | 2374675 A1 | 10/2011 |
| JP | 2002089506 A | 3/2002 |
| JP | 2003160045 A | 6/2003 |
| JP | 2012144255 A | 8/2012 |
| KR | 20140116477 A | 10/2014 |
| KR | 101462284 B1 | 11/2014 |
| KR | 20160116399 A | 10/2016 |
| KR | 20160122331 A | 10/2016 |
| KR | 20170091937 A | 8/2017 |

OTHER PUBLICATIONS

Written Opinion for related International Application No. PCT/KR2019/001154; report dated Aug. 8, 2019; (6 pages).
Extended European Search report for related European Application No. 19747081.8; action dated Oct. 21, 2021; (9 pages).

* cited by examiner

BRAKING CONTROL DEVICE AND BRAKING CONTROL METHOD OF CONSTRUCTION MACHINE

TECHNICAL FIELD

The present invention relates to a brake control system for construction machinery and a brake control method for construction machinery. More particularly, the present invention relates to a brake control system and a brake control method for a wheel type of construction machinery.

BACKGROUND ART

In a conventional hydraulic brake control apparatus for construction machinery, a driver may control a hydraulic brake valve using a brake pedal in a manual brake manner. However, because the hydraulic brake valve supplies a brake oil to both a front brake device and a rear brake device, it may be difficult to precisely control independently the front and rear brake devices according to conditions of the construction machinery.

DISCLOSURE OF THE INVENTION

Problems to be Solved

An object of the present invention provides an electro hydraulic brake control system for construction machinery capable of controlling independently a front brake device and a rear brake device.

Another object of the present invention provides a brake control method for construction machinery using the above brake control system.

Means to Solve the Problems

According to example embodiments, a brake control apparatus for construction machinery, includes first and second brake lines through which a brake oil is supplied to a front brake device and a rear brake device of the construction machinery, first and second proportional flow control valves installed respectively in the first and second brake lines to control a flow rate of the brake oil in proportion to inputted first and second brake control signals, a sensing portion configured to detect work and travel information of the construction machinery, and a controller configured to output the first and second brake control signals in response to a brake manipulation signal of a driver, and configured to control independently the first and second proportional flow control valves based on the work and travel information of the construction machinery detected by the sensing portion.

In example embodiments, the controller may convert the brake manipulation signal at a first conversion ratio to generate and output the first brake control signal and may convert the brake manipulation signal at a second conversion ratio to generate and output the second brake control signal.

In example embodiments, the first conversion ratio and the second conversion ratio may be changed depending on a magnitude of the brake manipulation signal.

In example embodiments, the first and second conversion ratios may have a first magnitude when the brake manipulation signal is less than a predetermined value, and the first and second conversion ratios may have a second magnitude when the brake manipulation signal is the predetermined value or more.

In example embodiments, the first and second conversion ratios may be adjusted to change according to a vehicle speed of the construction machinery.

In example embodiments, the first conversion ratio may increase as the vehicle speed increases and the second conversion ratio may decrease as the vehicle speed increases.

In example embodiments, the first conversion ratio and the second conversion ratio may be identical to each other when the vehicle speed is less than a predetermined value.

In example embodiments, the first and second conversion ratios may be adjusted to change according to live load of a bucket of the construction machinery.

In example embodiments, the first and second conversion ratios may be adjusted to change according to a height of a bucket of the construction machinery.

In example embodiments, in case that the construction machinery is on a slope, when the controller receives the brake manipulation signal for a certain period of time, the controller may execute a slope slip prevention mode and output the first and second brake control signals to operate the front brake device and the rear brake device.

In example embodiments, the controller may include a first control signal generator configured to convert the brake manipulation signal at a first conversion ratio based on the work and travel information of the construction machinery detected by the sensing portion to generate the first brake control signal, and a second control signal generator configured to convert the brake manipulation signal at a second conversion ratio based on the work and travel information of the construction machinery detected by the sensing portion to generate the second brake control signal.

In example embodiments, the sensing portion may include at least one of a boom angle sensor, a boom cylinder pressure sensor, a vehicle speed sensor and an acceleration sensor.

In example embodiments, the brake control apparatus for construction machinery may further include a parking brake line through which the brake oil is supplied to a parking brake device of the construction machinery, and a proportional direction control valve installed in the parking brake line to supply or block the brake oil according to an inputted parking control signal. The controller may output the parking control signal in case of an emergency occurrence.

In example embodiments, the brake control apparatus for construction machinery may further include an electronic pedal device configured to output the brake manipulation signal as an electronic signal in proportion to an angle change of a brake pedal by the driver.

According to example embodiments, a brake control apparatus for construction machinery includes a hydraulic pump configured to supply a brake oil, first and second brake lines connected to the hydraulic pump to supply the brake oil to a front brake device and a rear brake device of the construction machinery therethrough, first and second proportional flow control valves installed respectively in the first and second brake lines to control a flow rate of the brake oil in proportion to inputted first and second brake control signals, a sensing portion including a boom angle sensor, a bucket angle sensor and a vehicle speed sensor and configured to detect work and travel information of the construction machinery, an electronic pedal device configured to output a brake manipulation signal as an electronic signal in proportion to an angle change of a brake pedal by a driver, and a controller configured to output the first and second brake control signals in response to the brake manipulation signal of the electronic pedal device, and configured to control independently the first and second proportional flow control valves based on the work and travel information of the construction machinery detected by the boom angle sensor, the bucket angle sensor, the vehicle speed sensor and the electronic pedal device.

According to example embodiments, in a brake control method for construction machinery, a hydraulic system is provided, the hydraulic system including first and second brake lines through which a brake oil is supplied to a front brake device and a rear brake device of the construction machinery and first and second proportional flow control valves installed respectively in the first and second brake lines to control a flow rate of the brake oil in proportion to inputted first and second brake control signals. Work and travel information of the construction machinery are detected. The first and second brake control signals are outputted based on the work and travel information of construction machinery in response to a brake manipulation signal in order to independently the first and second proportional flow control valves.

In example embodiments, outputting the first and second brake control signals may include converting the brake manipulation signal at a first conversion ratio to generate and output the first brake control signal and converting the brake manipulation signal at a second conversion ratio to generate and output the second brake control signal.

In example embodiments, the first conversion ratio and the second conversion ratio may be changed depending on at least one of a magnitude of the brake manipulation signal, a vehicle speed of the construction machinery, live load of a bucket of the construction machinery and a height of a bucket of the construction machinery.

In example embodiments, outputting the first and second brake control signals may include, in case that the construction machinery is on a slope, when the brake manipulation signal is received for a certain period of time, executing a slope slip prevention mode and outputting the first and second brake control signals to operate the front brake device and the rear brake device.

In example embodiments, the brake control method for construction machinery may further include receiving the brake manipulation signal as an electronic signal in proportion to an angle change of a brake pedal by the driver.

Effects of the Invention

According to example embodiments, in a brake control apparatus and a brake control method for construction machinery, front and rear brake devices may be independently controlled using electro hydraulic brake control manner in consideration of work and travel information of the construction machinery. Additionally, when an unintended situation occurs, a safety accident may be prevented through a parking solenoid valve.

Thus, it may be possible to provide a vehicle braking control for unmanned/automated equipment of the construction machinery.

However, the effect of the invention may not be limited thereto, and may be expanded without being deviated from the concept and the scope of the present invention.

BEST MODE FOR CARRYING OUT THE INVENTION

Figure 1:
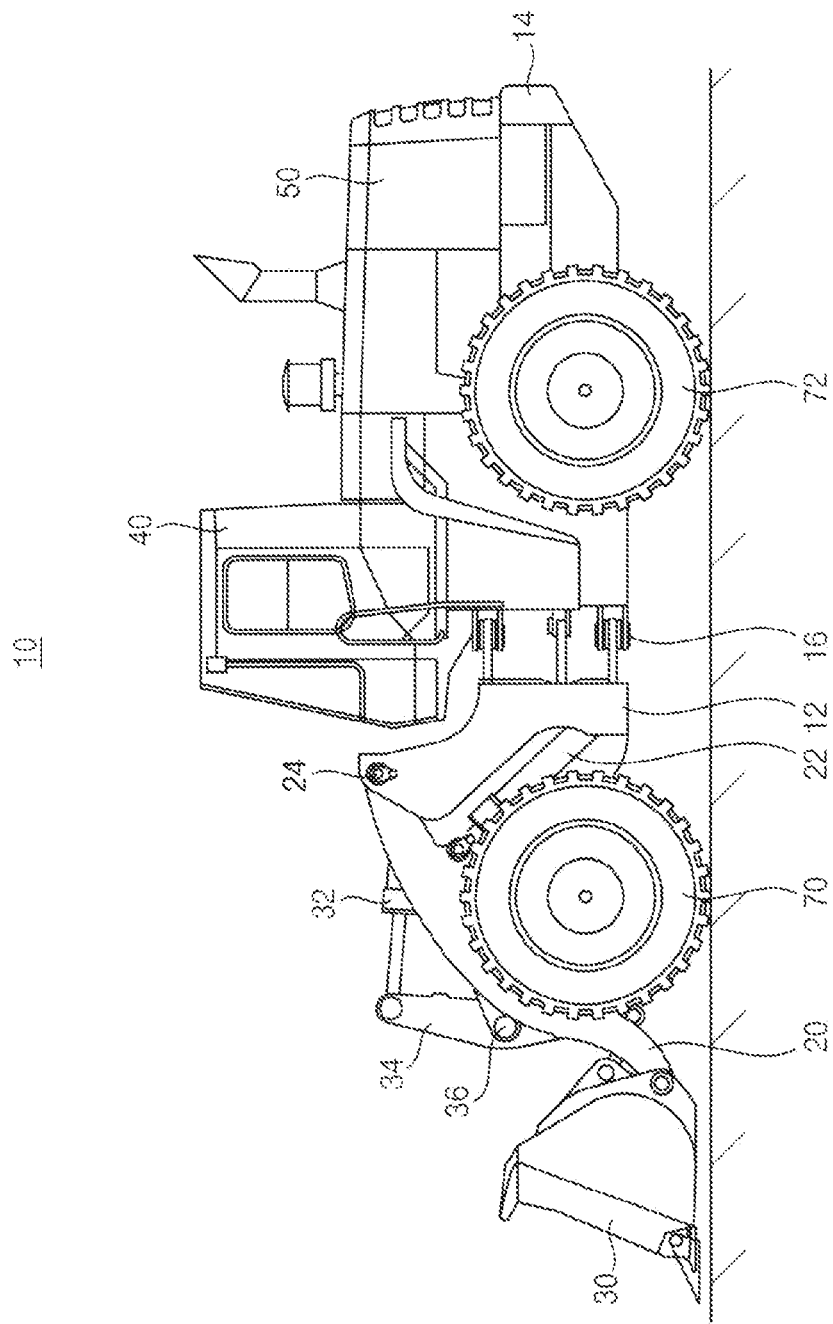
FIG. 1 is a side view illustrating construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
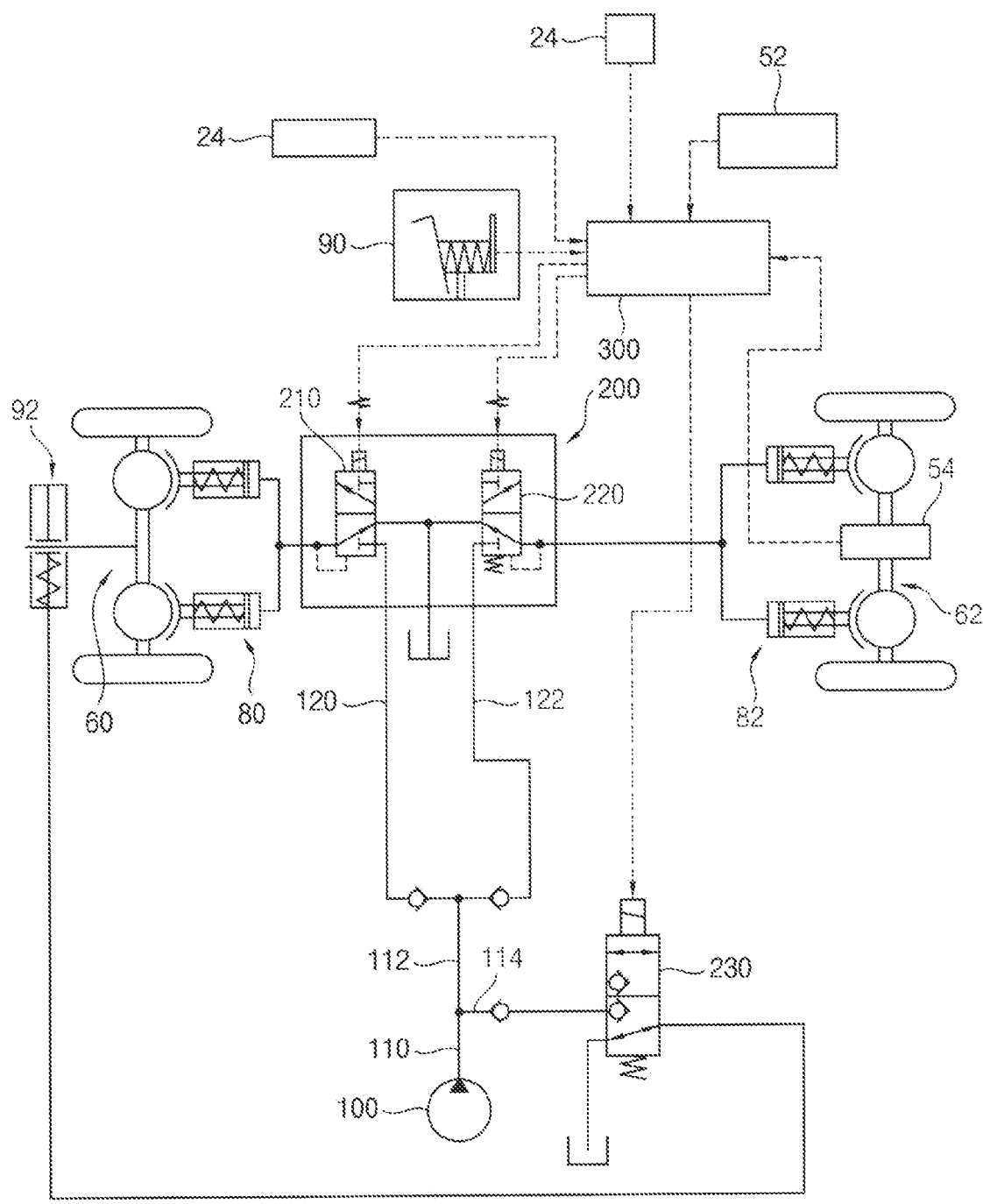
FIG. 2 is a hydraulic circuit diagram illustrating a control system for the construction machinery in FIG. 1.
Figure 3:
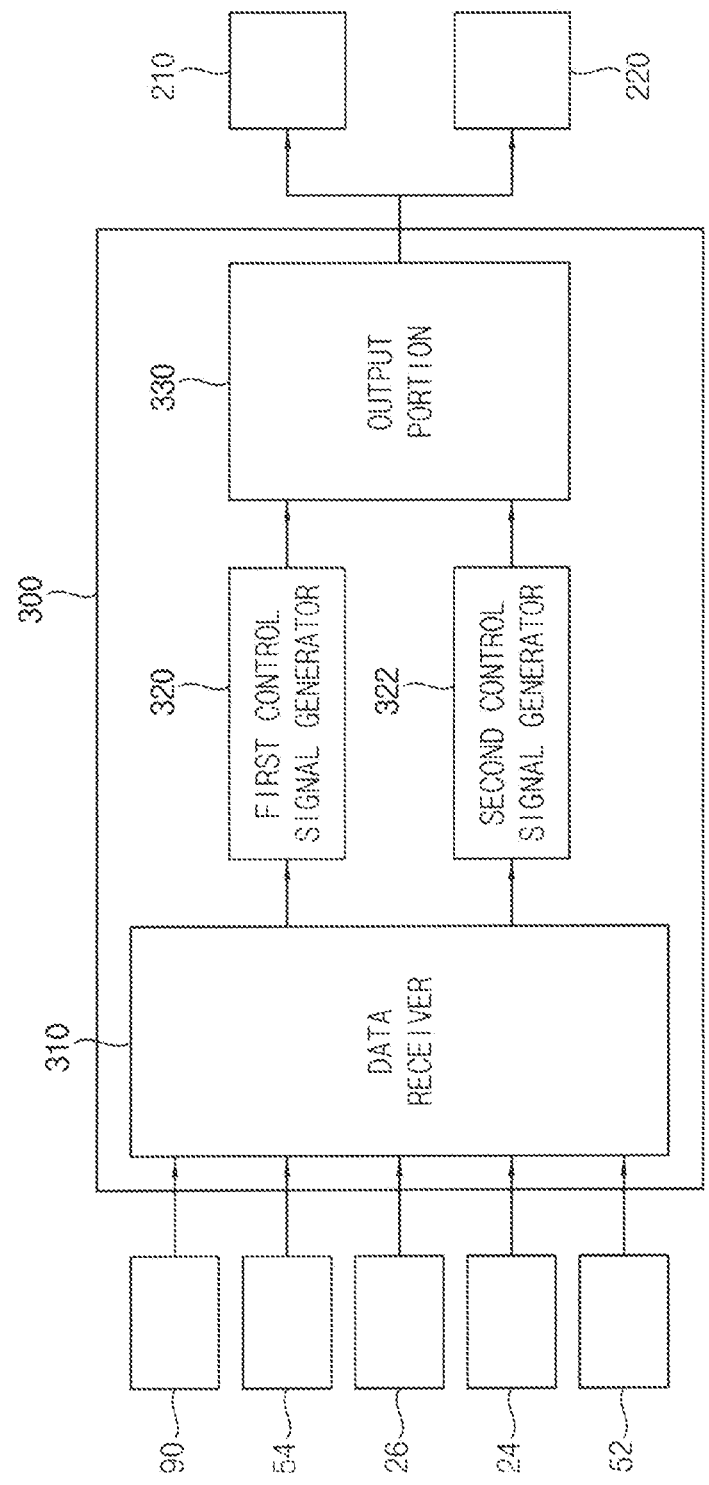
FIG. 3 is a block diagram illustrating a controller of the control system in FIG. 2.
Figure 4:
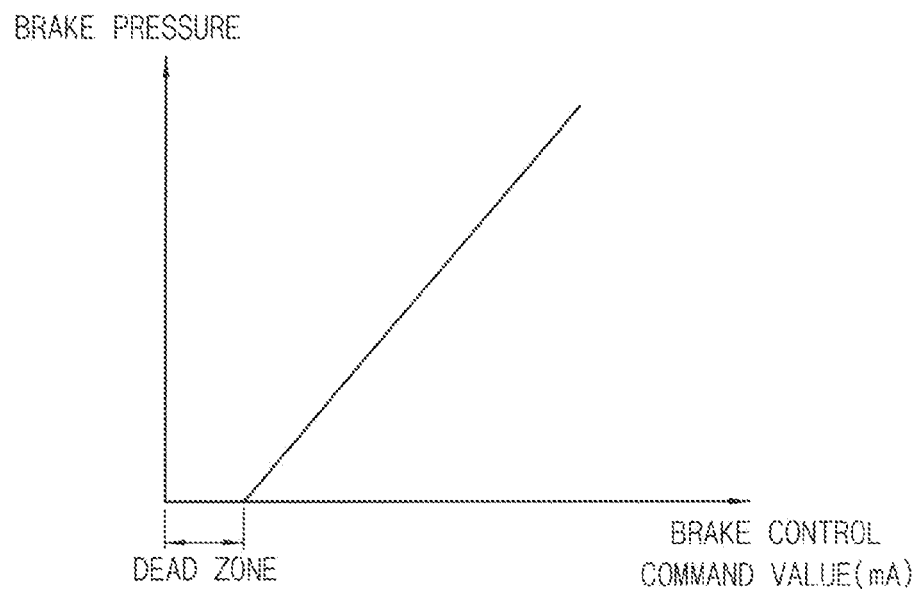
FIG. 4 is a graph illustrating a brake pressure in response to a brake control signal outputted from the controller in FIG. 3.
Figure 5:
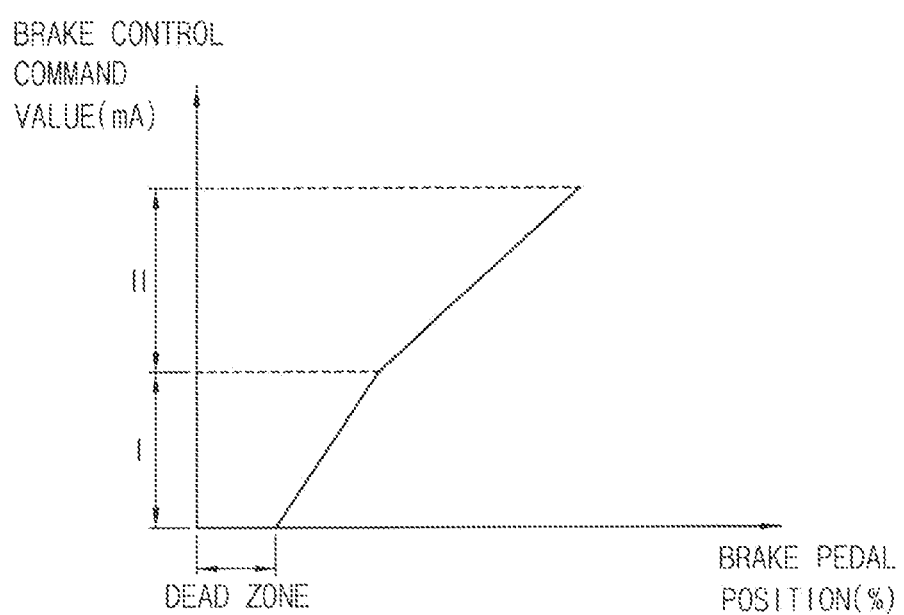
FIG. 5 is a graph illustrating a brake control signal according to a brake pedal position of a driver, which is generated by the controller in FIG. 3.
Figure 6:
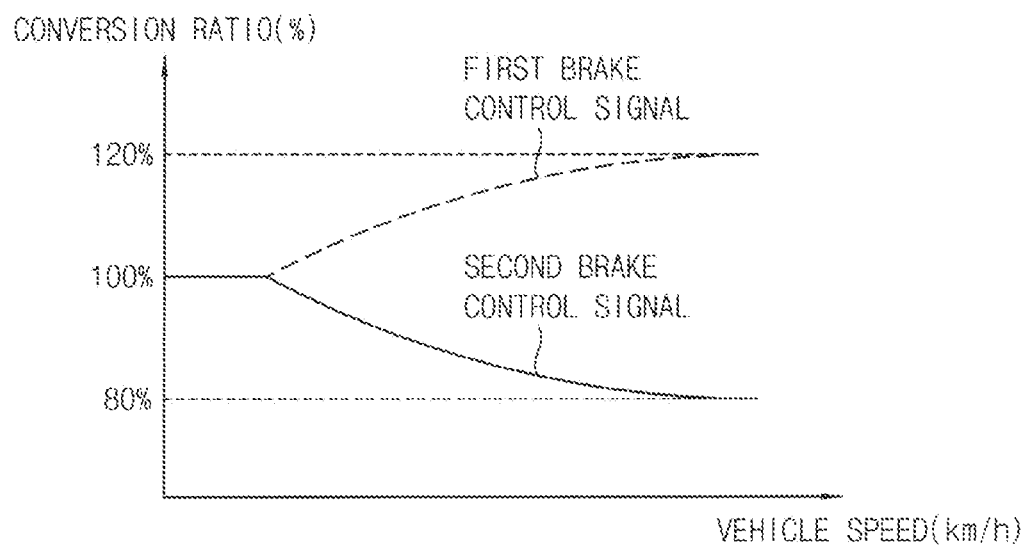
FIG. 6 is a graph illustrating a conversion rate of a brake control signal with respect to a brake pedal position according to a vehicle speed, which is generated by the controller in FIG. 3.
Figure 7:
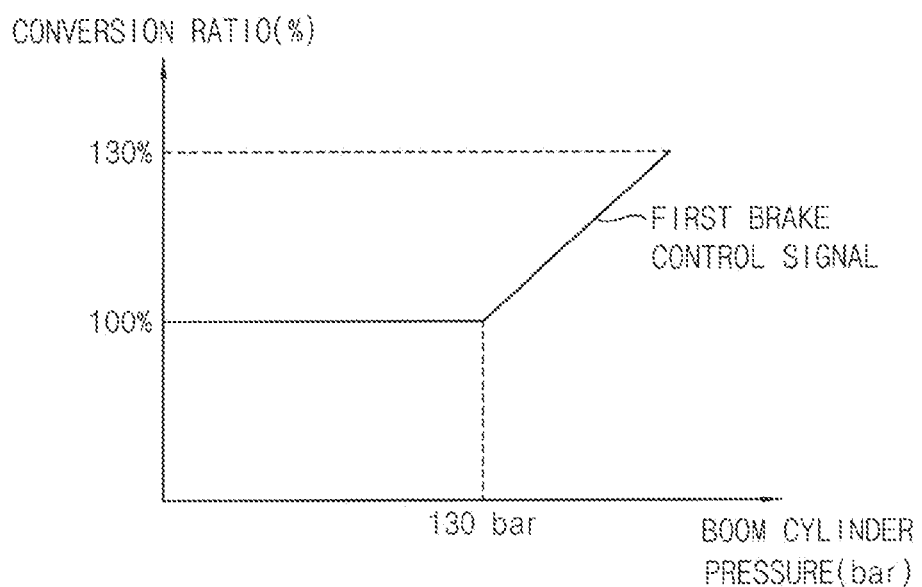
FIG. 7 is a graph illustrating a conversion rate of a brake control signal with respect to a brake pedal position according to a boom cylinder pressure, which is generated by the controller in FIG. 3.
Figure 8:
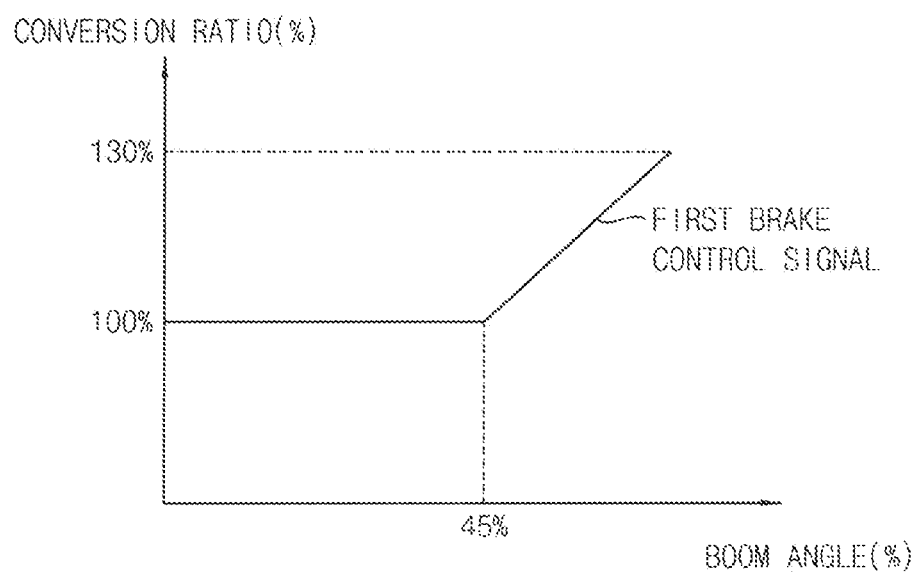
FIG. 8 is a graph illustrating a conversion rate of a brake control signal with respect to a brake pedal position according to a boom angle, which is generated by the controller in FIG. 3.

FIG. 1 is a side view illustrating construction machinery in accordance with example embodiments. FIG. 2 is a hydraulic circuit diagram illustrating a control system for the construction machinery in FIG. 1. FIG. 3 is a block diagram illustrating a controller of the control system in FIG. 2. FIG. 4 is a graph illustrating a brake pressure in response to a brake control signal outputted from the controller in FIG. 3. FIG. 5 is a graph illustrating a brake control signal according to a brake pedal position of a driver, which is generated by the controller in FIG. 3. FIG. 6 is a graph illustrating a conversion rate of a brake control signal with respect to a brake pedal position according to a vehicle speed, which is generated by the controller in FIG. 3. FIG. 7 is a graph illustrating a conversion rate of a brake control signal with respect to a brake pedal position according to a boom cylinder pressure, which is generated by the controller in FIG. 3. FIG. 8 is a graph illustrating a conversion rate of a brake control signal with respect to a brake pedal position according to a boom angle, which is generated by the controller in FIG. 3. Although the wheel loader 10 is illustrated in FIG. 1, the control system for the construction machinery according to example embodiments may not limited thereto, and it may be understood that example embodiments may be applied to wheel type construction machinery such as a wheel excavator. Hereinafter, for convenience of description, only the wheel loader 10 will be described.

Referring to FIG. 1, a wheel loader 10 may include a front body 12 and a rear body 14 rotatably connected to each other. The front body 12 may include a work apparatus and a front wheel 70. The rear body 14 may include a driver cabin 40, an engine bay 50 and a rear wheel 72.

The work apparatus may include a boom 20 and a bucket 30. The boom 20 may be freely pivotally attached to the front body 12, and the bucket 30 may be freely pivotally attached to an end portion of the boom 20. The boom 20 may be coupled to the front body 12 by a pair of boom cylinders 22, and the boom 20 may be pivoted upwardly and downwardly by expansion and contraction of the boom cylinders 22. A tilt arm 34 may be freely rotatably supported on the boom 20, almost at its central portion. One end portion of the tilt arm 34 may be coupled to the front body 12 by a pair of bucket cylinders 32 and another end portion of the tilt arm 34 may be coupled to the bucket 30 by a tilt rod, so that the bucket 30 may pivot (crowd and dump) as the bucket cylinder 32 expands and contracts.

The front body 12 and the rear body 14 may be rotatably connected to each other through a center pin 16 so that the front body 12 may swing side to side with respect to the rear body 14 by expansion and contraction of a steering cylinder (not illustrated).

A travel apparatus for propelling the wheel loader 10 may be mounted at the rear body 14. An engine 100 may be provided in the engine bay 50 to supply an output power to the travel apparatus. The travel apparatus may include a transmission connected to the engine, a propeller shaft, a front axle 60, a rear axle 70, etc. The output power of the engine may be transmitted to the front wheel 70 and the rear wheel 72 through the transmission, the propeller shaft, the front axle 60 and the rear axle 62, and thus the wheel loader 10 may travels.

As illustrated in FIG. 2, a control system for construction machinery may include a hydraulic pump 100 configured to supply a brake oil, a front brake device 80 and a rear brake device 82 configured to receive the brake oil to brake the front axle 60 and the rear axle 70 respectively, and a brake control apparatus configured to control the front brake device 80 and the rear brake device 82 in response to a manipulation of a driver.

The brake control apparatus may include first and second brake lines 120, 122 through which the brake oil is supplied to the front brake device 80 and the rear brake device 82 respectively, first and second proportional flow control valves 210, 220 installed respectively in the first and second brake lines 120, 122 to control a flow rate of the brake oil in proportion to inputted first and second brake control signals, a sensing portion configured to detect work and travel information of the construction machinery, and a controller 300 configured to output the first and second brake control signals according to a brake manipulation signal of the driver and configured to control independently the first and second proportional flow control valves 210, 220 based on the work and travel information of the construction machinery detected by the sensing portion.

In example embodiments, the hydraulic pump 100 may be connected to the engine through a power transmission device. The output power of the engine may be transmitted to the hydraulic pump 100. The brake oil discharged from the hydraulic pump 100 may be distributed to the front brake device 80 and the rear brake device 82 through the first and second brake control valves 210, 220. For example, the hydraulic pump 100 may be a pilot pump connected to an output shaft of the engine. The pilot pump may include a gear pump.

In particular, a main hydraulic line 110 may be connected to the hydraulic pump 100 to introduce the brake oil. The main hydraulic line 110 may be divided into a brake line 112 and a parking brake line 114. The brake line 112 may be divided into the first and second brake lines 120, 122. The first brake line 120 may be connected to the front brake device 80, and the second brake line 122 may be connected to the rear brake device 82. Additionally, as described later, the parking brake line 114 may be connected to a parking brake device 92.

A brake control valve may be installed in the first and second brake lines 120, 122 to control the flow rate of the brake oil according to an inputted electronic control signal. In particular, the first proportional flow control valve 210 may be installed in the first brake line 120 to control the flow rate of the brake oil in proportion to the inputted first brake control signal. The second proportional flow control valve 220 may be installed in the second brake line 122 to control the flow rate of the brake oil in proportion to the inputted second brake control signal.

For example, the first and second proportional flow control valves 210, 212 may include a proportional electro flow control valve. The flow rate of the brake oil passing through the proportional electro flow control valve may be in proportion to the inputted electronic control signal, for example, a magnitude of current command value (mA). As described later, the controller 300 may output the current command values (mA) as the first and second brake control signals to the first and second proportional flow control valves 210, 212, and the first and second proportion flow control valves 210, 212 may control the flow rates of the brake oil in proportion to magnitudes of the inputted brake control signals.

In example embodiments, the controller 300 may output the first and second brake control signals in response to a brake manipulation signal of the driver. The brake control apparatus for the construction machinery may further include an electronic pedal device 90 configured to output the brake manipulation signal as an electronic signal in proportion to an angle change of a brake pedal by the driver. For example, when the driver presses the brake pedal, the electronic pedal device 90 may detect an ON signal and the angle change of the brake pedal and output the electronic signal. The detected angle information may be transmitted to the controller 300 through CAN (controller area network), LIN (local interconnect network), FlexRay, etc.

In example embodiments, the sensing portion may include a boom angle sensor 24, a boom cylinder sensor 26, a vehicle speed sensor 54 and an acceleration sensor 52 to detect the work and travel information of the construction machinery.

The boom angle sensor 24 may detect a rotational angle of the boom 20 to provide information on a boom height. The boom angle sensor 24 may detect a change in magnetic field by rotation of the boom 20 to output a voltage value representing an angle θ of the boom 20.

The boom cylinder pressure sensor 26 may detect a pressure of the boom cylinder 22. The boom cylinder pressure sensor 26 may detect a change in pressure of the boom cylinder 22 by live load of the bucket 30.

The vehicle speed sensor 54 may detect speed information of the vehicle. The acceleration sensor 52 may be installed in the driver cabin 40 to detect an inclination angle of the vehicle with respect to a gravitational direction, a pitching rate of the vehicle, etc.

In example embodiments, the controller 300 may control independently the first and second proportional flow control valves 210, 220 based on the work and travel information of the construction machinery detected by the sensing portion. In particular, the controller 300 may include a data receiver 310 configured to receive the brake manipulation signal in proportion to the brake pedal manipulation amount of the driver from the electronic pedal device 90 and the work and travel information signals of the construction machinery detected by the sensing portion, first and second control signal generators 320, 322 configured to generate the first and second brake control signals based on the work and travel information of the construction machinery detected by the sensing portion respectively, and an output portion 330 configured to output the first and second brake control signals to the first and second brake control valves 210, 220 respectively.

For example, the first control signal generator 320 may convert the brake manipulation signal at a first conversion ratio based on the work and travel information of the construction machinery detected by the sensing portion to generate the first brake control signal. The second control signal generator 322 may convert the brake manipulation signal at a second conversion ratio based on the work and travel information of the construction machinery detected by the sensing portion to generate the second brake control signal. The first conversion ratio and the second conversion ratio may be adjusted to be identical to or different from each other according to the work and travel information of the construction machinery.

In example embodiments, the brake control apparatus for construction machinery may further include the parking brake line 114 through which the brake oil is supplied to the parking brake device 92, and a proportional direction control valve 230 installed in the parking brake line 114 to supply or block the brake oil according to an inputted parking control signal.

For example, the proportional direction control valve 230 may include a solenoid directional control valve. An ON-OFF operation of the solenoid directional control valve may be determined by the inputted parking control signal, for example, a current command value (mA).

The controller 300 may output the parking brake signal in case of a parking braking condition or an emergency occurrence, and the proportional direction control valve 230 may control an operation of the parking brake device 92 according to the parking control signal.

Hereinafter, a brake control method for construction machinery using the brake control apparatus in FIGS. 2 and 3 will be explained.

As illustrated in FIG. 4, first, an initial section of a brake pedal displacement may be set to a dead zone to prevent braking due to driver's mistakes, and in a section subsequent to the initial section, brake pressures of the front and rear brake devices 80, 82 may be controlled in proportion to the brake pedal displacement by the driver.

For example, the brake pressures (bar) of the front and rear brake devices 80, 82 may be maintained at 0 when the brake control signal (brake control command value (mA)) is within the initial section (dead zone).

As illustrated in FIG. 5, the brake control signal may be controlled for each section such that different brake pressures are generated in an initial brake section I and a main brake section II.

For example, the brake control signal (brake control command value (mA)) may be maintained at 0 when the brake manipulation signal (brake pedal displacement (%)) is within the initial section (dead zone), the brake control signal may be converted at a first ratio from the brake manipulation signal when the brake manipulation signal is within the initial brake section (Section I) after the dead zone, and the brake control signal may be converted at a second ratio less than the first ratio from the brake manipulation signal when the brake manipulation signal is within the main brake section (Section II). Thus, in the initial brake section (Section I), a brake control may be performed more quickly.

As illustrated in FIG. 6, because loads applied to the front axle 60 and the rear axle 62 during braking are different from each other depending on the vehicle speed, brake forces of the front axle 60 and the rear axle 62 may be independently controlled at a predetermined vehicle speed or more.

In particular, the first control signal generator 320 may convert the brake manipulation signal at a first conversion ratio to generate and output the first brake control signal, and the second control signal generator 322 may convert the brake manipulation signal at a second conversion ratio to generate and output the second brake control signal. The first conversion ratio and the second conversion ratio may be controlled to be identical to each other when the vehicle speed is less than a predetermined value, and The first conversion ratio and the second conversion ratio may be controlled to be different from each other when the vehicle speed is the predetermined value or more.

For example, the first conversion ratio may be controlled to increase as the vehicle speed increases and the second conversion ratio may be controlled to decrease as the vehicle speed increases when the vehicle speed is the predetermined value or more. Thus, as the vehicle speed increases, the brake force of the front axle 60 may be controlled to increase more relatively to the brake force of the rear axle 62 to thereby perform efficient brake control.

As illustrated in FIG. 7, because load applied to the front axle 60 varies depending on live load of the bucket 30, a brake force of the front axle 60 may be controlled to increase in proportion to the live load when the live load of the bucket is a predetermined value or more.

In particular, the first conversion ratio may be controlled to increase in proportion to the live load of the bucket 30 when the live load of the bucket 30 is 50% or more based on a boom cylinder pressure. Thus, as the live load of the bucket increases, the brake force of the front axle 60 may be controlled to increase to thereby perform efficient brake control.

As illustrated in FIG. 8, because loads applied to the front axle 60 and the rear axle 62 during braking are different from each other depending on a height of the bucket 30, a brake force of the front axle 60 may be controlled to increase in proportion to the height of the bucket 30 when the height of the bucket 30 from a ground surface is a predetermined height or more.

In particular, the first conversion ratio may be controlled to increase as the height of the bucket 30 increases when the height of the bucket 30 is 40% or more based on a boom angle. Thus, as the height of the bucket increases, the brake force of the front axle 60 may be controlled to increase to thereby perform efficient brake control.

In example embodiments, in case that the construction machinery is on a slope, when the controller 300 receives the brake manipulation signal for a certain period of time, the controller 300 may execute a slope slip prevention mode and output the first and second brake control signals to operate the front brake device 80 and the rear brake device 82.

In particular, the controller 300 may determine whether the slope slip prevention mode is satisfied (slope condition (5 degrees or more), vehicle speed state (stationary state, 0 km/h), brake pedal input condition (100%, 2 seconds or more), acceleration pedal input condition (0%), and may determine an entry time of the slope slip prevention mode.

In the slop slip prevention mode, the controller 300 may output the first and second brake control signals to the first and second brake control valves 210, 212 respectively. Thus, even if the driver does not press the brake pedal, the front and rear brake devices 80, 82 may operate to prevent the construction machinery 10 from being slipped.

The controller 300 may terminate the slope slip prevention mode operation when the controller 300 receives any one of a brake pedal input condition (newly inputted brake pedal position 80% or more), an acceleration pedal input (50% or more) and a lever change of a FNR travel lever.

In example embodiments, when an unexpected situation occurs regardless of the driver's will, the controller 300 may output the first and second brake control signals or the parking control signal to prevent an occurrence of a safety accident.

As mentioned above, the brake control apparatus for the construction machinery may control independently the front and rear brake devices 80, 82 using electro hydraulic brake control manner. Additionally, when an unintended situation occurs, a safety accident may be prevented through the parking solenoid valve 230. Thus, it may be possible to provide a vehicle braking control for unmanned/automated equipment of the construction machinery.

Hereinafter, a brake control method for construction machinery using the brake control apparatus in FIGS. 2 and 3 will be explained.

Figure 9:
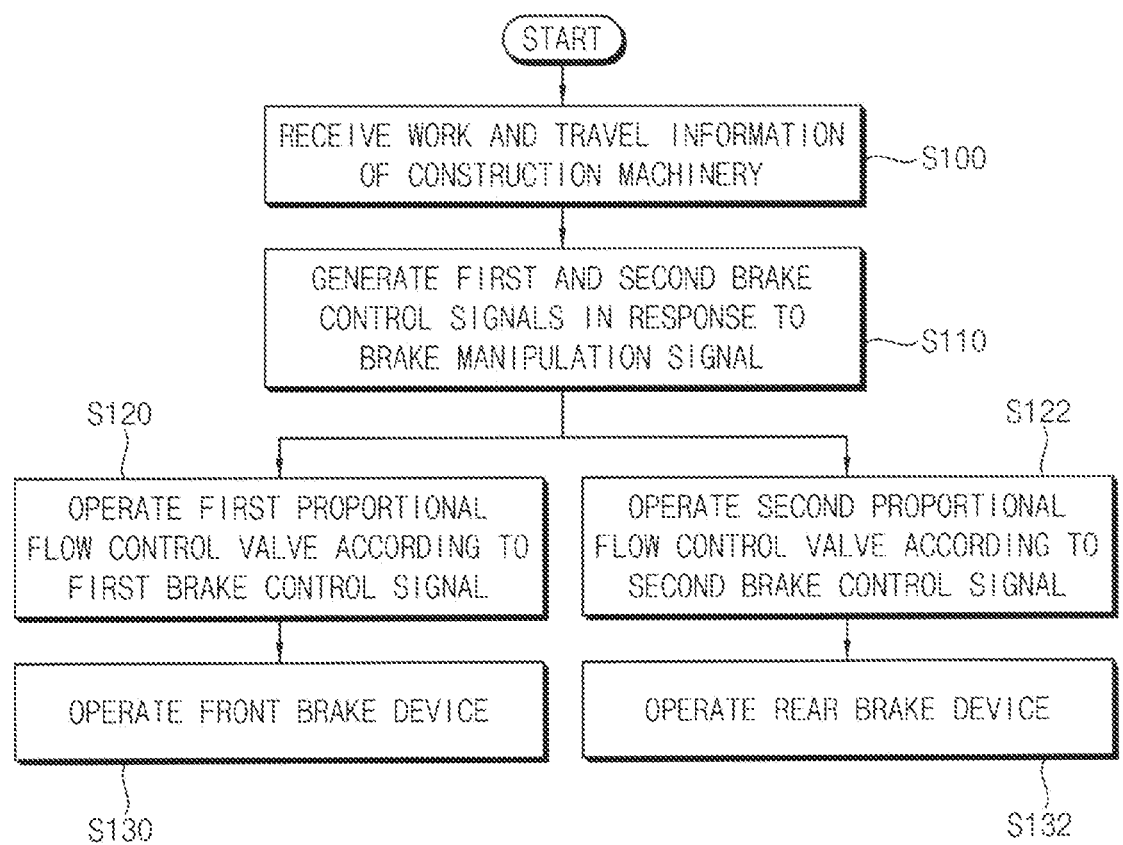
FIG. 9 is a flow chart illustrating a brake control method for construction machinery in accordance with example embodiments.

FIG. 9 is a flow chart illustrating a brake control method for construction machinery in accordance with example embodiments.

Referring to FIGS. 2, 3 and 9, a brake manipulation signal of a driver and work and travel information of construction machinery may be received (S100).

In example embodiments, the driver may input the brake manipulation signal for the front and rear brake devices 80, 82 through an electronic pedal device 90. The work and travel information of the construction machinery may be obtained through a sensing portion installed in the construction machinery.

For example, a rotational angle of a boom 20 may be detected by a boom angle sensor 24 to obtain information on a boom height. A pressure of the boom cylinder 22 may be detected by a boom cylinder pressure sensor 26 to obtain information on live load of a bucket 30. Speed information of the vehicle may be obtained by a vehicle speed sensor 54. Information on an inclination angle of the vehicle with respect to a gravitational direction, a pitching rate of the vehicle, etc. may be obtained by an acceleration sensor 54.

Then, first and second brake control signals in response to the brake manipulation signal may be generated respectively based on the information (S110), a first proportional flow control valve 210 may be operated according to the first brake control signal (S120), and a second proportional flow control valve 220 may be operated according to the second brake control signal (S122). Then, operations of front and rear brake devices 80, 82 may be controlled by a brake oil (S130, S132).

In example embodiments, the brake manipulation signal may be converted at a first conversion ratio to generate the first brake control signal and the brake manipulation signal may be converted at a second conversion ratio to generate the second brake control signal based on the work and travel information of the construction machinery. The first conversion ratio and the second conversion ratio may be adjusted to be identical to or different from each other according to the work and travel information of the construction machinery. The first and second brake control valves 210, 212 may control flow rates of the brake oil in proportion to magnitudes of the first and second brake control signals.

For example, brake forces of a front axle 60 and a rear axle 62 may be controlled independently when the vehicle speed is a predetermined value or more. The first conversion ratio may be controlled to increase as the vehicle speed increases and the second conversion ratio may be controlled to decrease as the vehicle speed increases when the vehicle speed is the predetermined value or more. Thus, as the vehicle speed increases, the brake force of the front axle 60 may be controlled to increase more relatively to the brake force of the rear axle 62 to thereby perform efficient brake control.

The brake force of the front axle 60 may be controlled to increase in proportion to the live load of the bucket 30 when the live load of the bucket 30 is a predetermined value or more. The first conversion ratio may be controlled to increase in proportion to the live load of the bucket 30 when the live load of the bucket 30 is 50% or more. Thus, as the live load of the bucket increases, the brake force of the front axle 60 may be controlled to increase to thereby perform efficient brake control.

The brake force of the front axle 60 may be controlled to increase in proportion to a height of the bucket 30 when the height of the bucket 30 from a ground surface is a predetermined height or more. The first conversion ratio may be controlled to increase as the height of the bucket 30 increases when the height of the bucket 30 is 40% or more. Thus, as the height of the bucket increases, the brake force of the front axle 60 may be controlled to increase to thereby perform efficient brake control.

In case that the construction machinery is on a slope, when the brake manipulation signal is received for a certain period of time, a slope slip prevention mode may be executed to output the first and second brake control signals to operate the front brake device 80 and the rear brake device 82.

In particular, it may be determined whether an entry condition of the slope slip prevention mode is satisfied (for example, slope condition (5 degrees or more), vehicle speed state (stationary state, 0 km/h), brake pedal input condition (100%, 2 seconds or more), acceleration pedal input condition (0%)), and an entry time of the slope slip prevention mode may be determined. Additionally, when any one of termination conditions of the slope slip prevention mode operation, for example, a brake pedal input condition (newly inputted brake pedal position 80% or more), an acceleration pedal input (50% or more), a lever change of a FNR travel lever, etc. is satisfied, the slope slip prevention mode operation may be terminated.

Additionally, when an unexpected situation occurs regardless of the driver's will, the first and second brake control signals or the parking control signal may be outputted to prevent an occurrence of a safety accident.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: wheel loader 12: front body
14: rear body 20: boom
22: boom cylinder 24: boom angle sensor
30: bucket 32: bucket cylinder
34: tilt arm 36: bucket angle sensor
40: driver cabin 50: engine bay
52: acceleration sensor 54: speed sensor
60: front axle 62: rear axle
70: front wheel 72: rear wheel
80: front brake device 82: rear brake device
90: electronic pedal device 92: parking brake device
100: hydraulic pump 110: main hydraulic line
112: brake line 114: parking brake line
120: first brake line 122: second brake line
200: brake control valve 210: first brake control valve
220: second brake control valve 230: proportional direction control valve
300: controller 310: data receiver
320: first control signal generator 322: second control signal generator
340: output portion

The invention claimed is:

1. A brake control apparatus for construction machinery, comprising:
    first and second brake lines through which a brake oil is supplied to a front brake device and a rear brake device of the construction machinery;
    first and second proportional flow control valves installed respectively in the first and second brake lines to control a flow rate of the brake oil in proportion to inputted first and second brake control signals;
    a sensing portion configured to detect work and travel information of the construction machinery; and
    a controller configured to output the first and second brake control signals in response to a brake manipulation signal of a driver, and configured to control independently the first and second proportional flow control valves based on the work and travel information of the construction machinery detected by the sensing portion,
    wherein the controller converts the brake manipulation signal at a first conversion ratio to generate and output the first brake control signal and converts the brake manipulation signal at a second conversion ratio to generate and output the second brake control signal,
    wherein the first and second conversion ratios are adjusted to change according to a vehicle speed of the construction machinery, and
    wherein the first conversion ratio increases as the vehicle speed increases and the second conversion ratio decreases as the vehicle speed increases.

2. The brake control apparatus for construction machinery of claim 1, wherein the first conversion ratio and the second conversion ratio are changed depending on a magnitude of the brake manipulation signal.

3. The brake control apparatus for construction machinery of claim 2, wherein the first and second conversion ratios have a first magnitude when the brake manipulation signal is less than a predetermined value, and the first and second conversion ratios have a second magnitude when the brake manipulation signal is the predetermined value or more.

4. The brake control apparatus for construction machinery of claim 1, wherein the first conversion ratio and the second conversion ratio are identical to each other when the vehicle speed is less than a predetermined value.

5. The brake control apparatus for construction machinery of claim 1, wherein the first and second conversion ratios are adjusted to change according to live load of a bucket of the construction machinery.

6. The brake control apparatus for construction machinery of claim 1, wherein the first and second conversion ratios are adjusted to change according to a height of a bucket of the construction machinery.

7. The brake control apparatus for construction machinery of claim 1, wherein in case that the construction machinery is on a slope, when the controller receives the brake manipulation signal for a certain period of time, the controller executes a slope slip prevention mode and output the first and second brake control signals to operate the front brake device and the rear brake device.

8. The brake control apparatus for construction machinery of claim 1, wherein the controller comprises:
    a first control signal generator configured to convert the brake manipulation signal at the first conversion ratio based on the work and travel information of the construction machinery detected by the sensing portion to generate the first brake control signal; and
    a second control signal generator configured to convert the brake manipulation signal at the second conversion ratio based on the work and travel information of the construction machinery detected by the sensing portion to generate the second brake control signal.

9. The brake control apparatus for construction machinery of claim 1, wherein the sensing portion comprises at least one of a boom angle sensor, a boom cylinder pressure sensor, a vehicle speed sensor and an acceleration sensor.

10. The brake control apparatus for construction machinery of claim 1, further comprising:
    a parking brake line through which the brake oil is supplied to a parking brake device of the construction machinery; and a proportional direction control valve installed in the parking brake line to supply or block the brake oil according to an inputted parking control signal, and wherein the controller outputs the parking control signal in case of an emergency occurrence.

11. The brake control apparatus for construction machinery of claim 1, further comprising:

an electronic pedal device configured to output the brake manipulation signal as an electronic signal in proportion to an angle change of a brake pedal by the driver.

12. A brake control apparatus for construction machinery, comprising:

a hydraulic pump configured to supply a brake oil;

first and second brake lines connected to the hydraulic pump to supply the brake oil to a front brake device and a rear brake device of the construction machinery therethrough;

first and second proportional flow control valves installed respectively in the first and second brake lines to control a flow rate of the brake oil in proportion to inputted first and second brake control signals;

a sensing portion including a boom angle sensor, a bucket angle sensor and a vehicle speed sensor and configured to detect work and travel information of the construction machinery;

an electronic pedal device configured to output a brake manipulation signal as an electronic signal in proportion to an angle change of a brake pedal by a driver; and a controller configured to output the first and second brake control signals in response to the brake manipulation signal of the electronic pedal device, and configured to control independently the first and second proportional flow control valves based on the work and travel information of the construction machinery detected by the boom angle sensor, the bucket angle sensor, the vehicle speed sensor and the electronic pedal device, wherein the controller converts the brake manipulation signal at a first conversion ratio to generate and output the first brake control signal and converts the brake manipulation signal at a second conversion ratio to generate and output the second brake control signal, wherein the first and second conversion ratios are adjusted to change according to a vehicle speed of the construction machinery, and wherein the first conversion ratio increases as the vehicle speed increases and the second conversion ratio decreases as the vehicle speed increases.

13. A brake control method for construction machinery, comprising;

providing a hydraulic system including first and second brake lines through which a brake oil is supplied to a front brake device and a rear brake device of the construction machinery and first and second proportional flow control valves installed respectively in the first and second brake lines to control a flow rate of the brake oil in proportion to inputted first and second brake control signals;

detecting work and travel information of the construction machinery;

outputting the first and second brake control signals based on the work and travel information of construction machinery in response to a brake manipulation signal in order to independently the first and second proportional flow control valves, wherein outputting the first and second brake control signals comprises converting the brake manipulation signal at a first conversion ratio to generate and output the first brake control signal and converting the brake manipulation signal at a second conversion ratio to generate and output the second brake control signal wherein the first and second conversion ratios are adjusted to change according to a vehicle speed of the construction machinery, and wherein the first conversion ratio increases as the vehicle speed increases and the second conversion ratio decreases as the vehicle speed increases.

14. The brake control method for construction machinery of claim 13, wherein the first conversion ratio and the second conversion ratio are changed depending on at least one of a magnitude of the brake manipulation signal, live load of a bucket of the construction machinery and a height of a bucket of the construction machinery.

15. The brake control method for construction machinery of claim 13, wherein outputting the first and second brake control signals comprises, in case that the construction machinery is on a slope, when the brake manipulation signal is received for a certain period of time, executing a slope slip prevention mode and outputting the first and second brake control signals to operate the front brake device and the rear brake device.

16. The brake control method for construction machinery of claim 13, further comprising:

receiving the brake manipulation signal as an electronic signal in proportion to an angle change of a brake pedal by the driver.

\* \* \* \* \*